United States Patent [19]
Mead

[11] 4,099,230
[45] Jul. 4, 1978

[54] HIGH LEVEL CONTROL PROCESSOR

[75] Inventor: Carver A. Mead, Pasadena, Calif.

[73] Assignee: California Institute of Technology, Pasadena, Calif.

[21] Appl. No.: 601,280

[22] Filed: Aug. 4, 1975

[51] Int. Cl.² ............................................. G06F 9/10
[52] U.S. Cl. ............................................. 364/200
[58] Field of Search ............... 340/172.5; 445/1; 444/1; 364/200, 900, 200 MS File, 300, 900 MS File

[56] References Cited

U.S. PATENT DOCUMENTS

| | | | |
|---|---|---|---|
| 3,564,504 | 2/1971 | Morenoff et al. | 340/172.5 |
| 3,614,745 | 10/1971 | Podvin et al. | 340/172.5 |
| 3,665,421 | 5/1972 | Rehausser et al. | 340/172.5 |
| 3,764,996 | 10/1973 | Ross | 340/172.5 |
| 3,840,863 | 10/1974 | Fugua et al. | 340/172.5 |
| 3,878,513 | 4/1975 | Werner | 340/172.5 |
| 3,900,834 | 4/1975 | Casey et al. | 340/172.5 |

*Primary Examiner*—Mark E. Nusbaum
*Attorney, Agent, or Firm*—Lindenberg, Freilich, Hornbaker, Wasserman, Rosen & Fernandez

[57] ABSTRACT

A method and means for implementing the control structure of a computer comprising, for example the basic constructs of repetition, conditional execution, and nesting whereby, at any point, a machine language program can be decompiled into the English language source that produced it. The program is loaded into the memory of the machine in a manner to be location independent, so that each segment of a program may be debugged individually, if necessary, without affecting the balance of the program.

10 Claims, 6 Drawing Figures

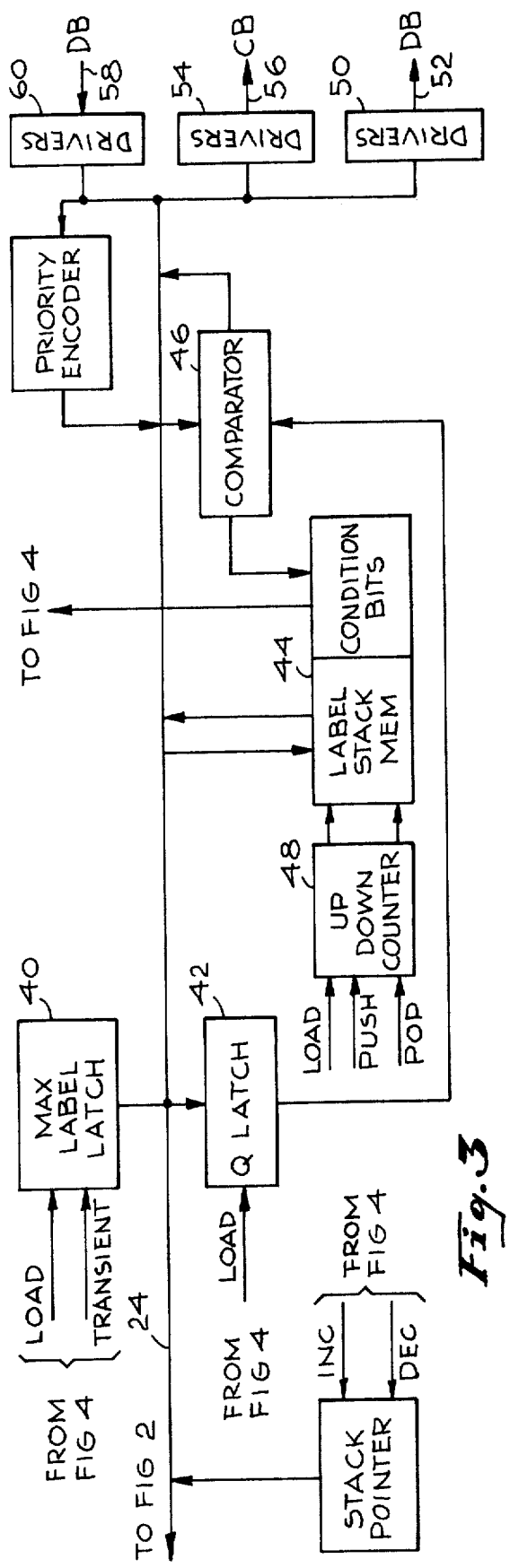
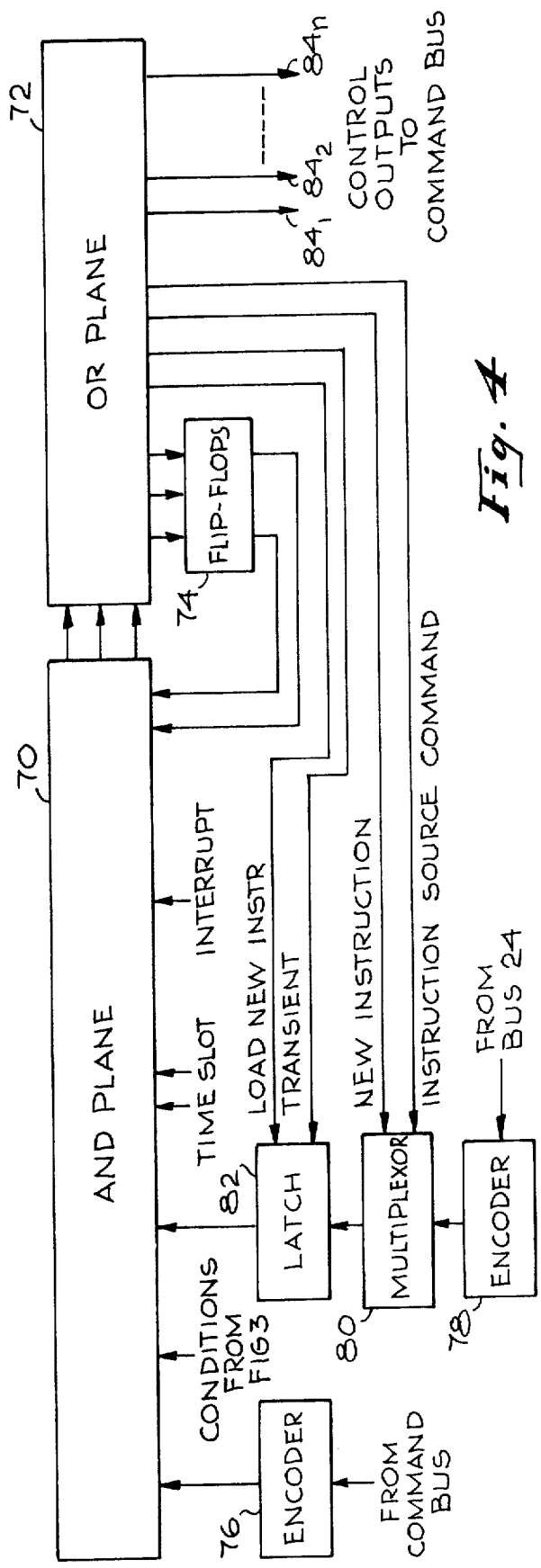
Fig. 3
Fig. 4

Fig. 5

| | DO RUN TIME | DO RUN TIME SKIP MODE | LABEL (LOAD TIME) | INTERRUPT |
|---|---|---|---|---|
| INTERRUPT | 0 | 0 | 0 | 1 |
| LOAD TIME | | | — — — — | |
| RUN TIME | — — — — — — | | | |
| SKIP MODE | 0 0 0 0 — — | — | | |
| CONDITION ≥ | | | — | |
| TIME SLOT | 0 0 — 0 0 — 0 0 — — | | 0 0 — 0 0 — | 0 0 — 0 0 — 0 0 — |
| INSTRUCTION | DO ~~~ | | LABEL ~~ | — — — — / — — — — / INT SERV ~~ |
| NEW INSTR SUBSTITUTE | 0 ~~~ | | 0 ~~ | — — — — / INT REQ / — — — — / INT SERV |
| SKIP MODE SET | | | | |
| SKIP RESET | | | | |
| Q LATCH | — | | — | |
| Q CLEAR | | | | |
| PROG MEM OUT | — | — | — | — — — |
| NEW INSTR | | — | — | — — — |
| PC LOAD | | — | | — |
| PC INC | — | — | — | — — |
| LABEL TABLE WRITE | — | | — | — |
| LABEL STACK { OUT / PUSH / POP / WRITE } | — / / / — | | | |
| STACK POINTER { OUT / INC / DEC } | — / — / | | | / — / |
| MAX LABEL LATCH | | | — | |
| MAX LABEL OUT | | | — | |
| PRTY ENCODER→BUS | | | | |
| CB OUT | | | | |
| DB OUT | | | | — |
| DB IN | | | | — |
| DO BIT | — | | | |

HIGH LEVEL CONTROL PROCESSOR

ORIGIN OF INVENTION

This invention herein described was made in the course of work performed under a contract with the Office of Naval Research.

BACKGROUND OF THE INVENTION

This invention relates to a method and means for implementing program storage and retrieval in a computer and more particularly to improvements therein.

Computers of early origin were memory address oriented, that is, programs were written in which control instructions for looping and conditional branching directed the machine to commence its program sequence at a specified memory address and direct further operations by providing specific addresses. When it became clear that what was needed was not for the program to resume execution at a given memory address, but rather at a given program step, assembly programs were written which would automatically allocate a memory address for the program such that entry points could be specified at a program step than rather at a memory address. This arrangement brought its own set of problems. Since the programmer could branch from any point in the program to any other point, programmers wrote programs to be as compact as possible. This would entail using a given segment of a code for three or four given sections of the operation by branching to it from one place and out to another place. When problems arose they were fixed by branching to a program segment which contained a "patch" for fixing the program, after which the machine was directed to switch back to the original program. After several generations of fixes such a program was totally opaque.

The technique for assembling a large software project was to conceptually break a problem to pieces and then assign the pieces to separate programmers. They would write the software for their piece and then the headache of assembling the programs which were written would occur. Since one programmer did not know precisely what others would be doing, conventions would be mixed, locations would be used for several purposes that were mutually inconsistent, therefore the problem of integrating several bundles of software into a single larger one would involve a large number of headaches, a larger number of fixes, and basically would result in a mountain of software which if not unworkable, was unwieldy and inefficient. Since it was known that the slightest change to the software might blow the entire process, everyone was reluctant to change anything.

Recently the concept of structured programming was introduced which, when correctly implemented, has been capable of reducing, by orders of magnitude, the uncertainties and complexities associated with writing large software programs. The basic philosophy of the technique is to design from the top down the entire program to specify at the beginning, in precise terms, what is attempted to be done and what each building block at each level of program will have to do. Basically, the most prominent use of computing machinery is for controlling processes. The process may be a solution of an arithmetic problem, the operation of an oil refinery or a power plant, or the maintenance of a data base. Whatever the case, the central role of computer itself is to oversee and control the process. In the course of this, all the data related to this process must be handled, examined, stored, and modified into the format in which it is useful, either to the computer itself or to the human being which must interact with the process and its controller.

Finally, most importantly, a modern piece of computing machinery must allow a human being to test and modify the process in whatever way he choses and with the greatest ease possible. This is a most difficult, yet most important requirement.

OBJECTS AND SUMMARY OF THE INVENTION

An object of this invention is the provision of a programming method and means which is simple to implement and to debug.

Another object of this invention is the provision of the novel and useful method and means for programming a computer which more readily lends itself to organization for problem solving.

Yet another object of the invention is the provision of a novel control system for a computer wherein a very small number of very high level control constructs are capable of providing the entire control structure of a very large system.

The foregoing and other objects of the invention may be achieved in an arrangement wherein the memory for storing the program effectively comprises two memories, one which is called the program memory and the other a label table. Each set of instructions corresponding to a different program segment is identified by a label. Each label represents an address in the label table. A complete set of programs and their labels are loaded into the program memory. The contents of the program memory are then cycled. A program counter which is synchronously driven, indicates the storage address of each instruction as it is read out of the program memory. When a label for a set of instructions, constituting a specific program segment, is detected, the label table is instructed to store, at the address represented by the label, the address of the particular program segment which is derived from the program counter. Subsequently whenever it is desired to call out a new set of instructions, this is done by using the label as an address for a read out from the label table, which provides an address which is entered into the program counter, which is the address register for the program memory.

Provision is made for conditional execution and branching as well as nesting, using labels in place of addresses. Problems in programming are easily analyzed and, because of the location independence of programs in the program memory, may be fixed without disturbing anything else.

In an alternative embodiment of this invention, the labels can be detected as they are being transferred into the program memory, and the operations of incrementing the address, indicated by the program counter, to indicate the address of the first instruction under that label and then storing that address in the label memory at the address represented by the label, can then take place.

BRIEF DESCRIPTION OF THE DRAWINGS

FIG. 3 is a block schematic diagram of a portion of the embodiment of the invention which keeps track of program addresses for handling branching and nesting operations.

FIG. 4 is a block schematic diagram of the program process control portion of the invention.

FIG. 5 is a schematic drawing illustrating an arrangement for a planned logic array used in a micro program control in accordance with this invention. FIG. 5 is a simplified schematic illustration for a PLA.

DESCRIPTION OF THE PREFERRED EMBODIMENTS

FIGURE 1

Figure 1:
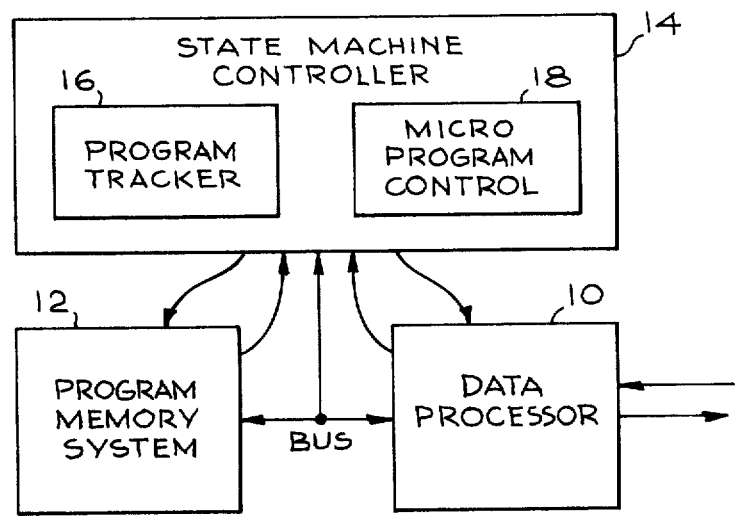
FIG. 1 is a block schematic of a general computer arrangement illustrating how the embodiment of the invention fits with such general computer arrangement.

Referring now to FIG. 1 there may be seen a block schematic diagram of an embodiment of this invention. A computer will contain the data processor structures 10, a program memory module 12 for providing the program for instructing the data processing and a state machine controller 14. In accordance with this invention the state machine controller 14 includes a program tracker circuit 16, and a micro program control circuit 18. The program memory module, which is shown in more detail in FIG. 2, stores the many different program segments required for operating the data processor, at locations which are identified by program labels rather than strictly numerical addresses. The program tracker circuit 16, which is shown in FIG. 3, comprises an arrangement for keeping track of locations within programs to which a return should be made after a branch has been executed, and also keeps track of nesting information whereby the proper return from a nested program segment through several successive layers of program segments to the authority program may be made. FIG. 4 is a block schematic diagram of the micro program control equipment 18, required for operation.

Figure 2:
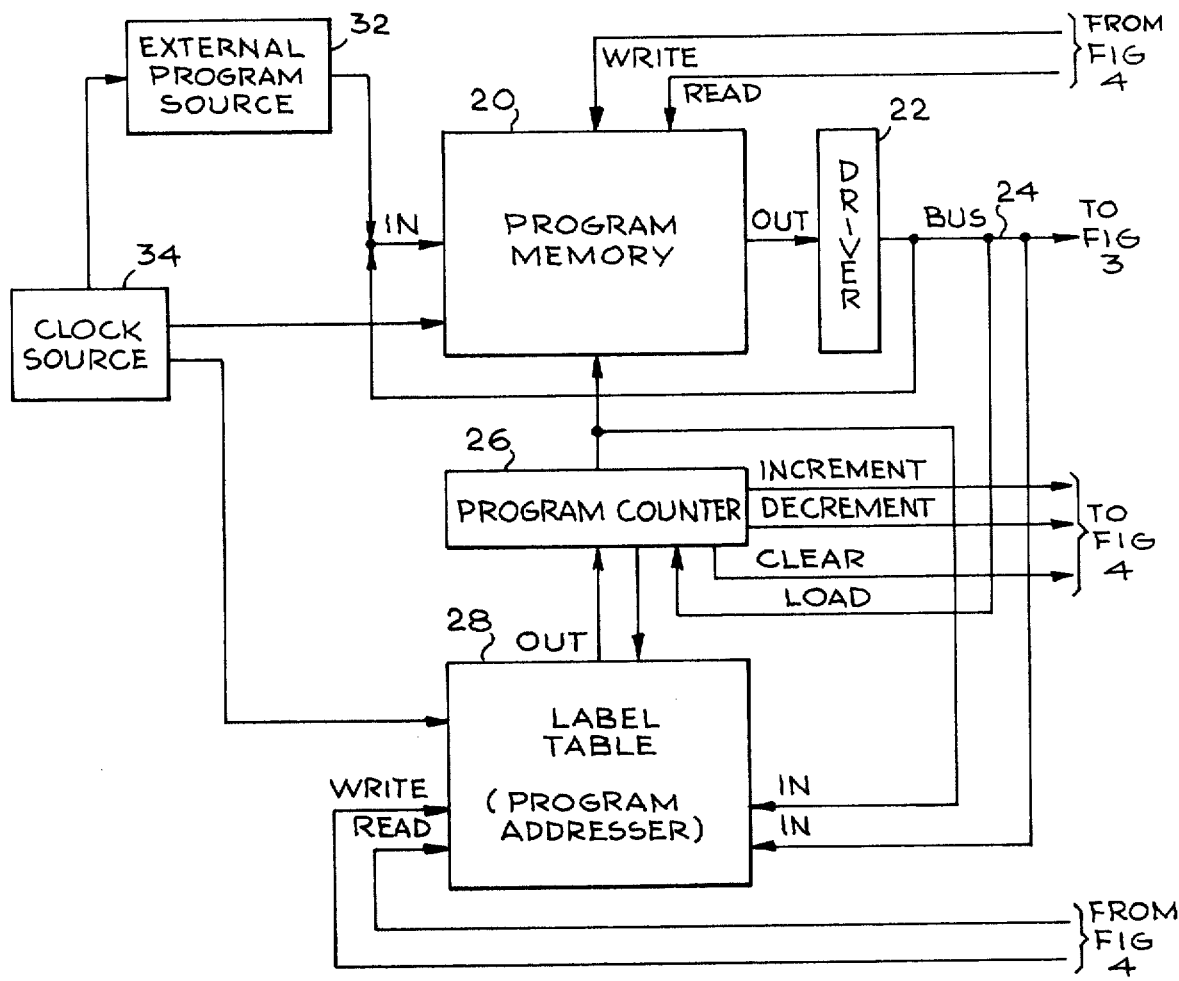
FIG. 2 is a block schematic diagram of a program memory module portion of the embodiment of the invention.

Referring now to FIG. 2, the program memory module consists of a program memory 20 for storing programs. On the assumption that each instruction word used in this system comprises 12 bits, the memory is arranged to receive 12 bit input and to provide a 12 bit output, which is applied to a driver circuit, 22, the output of which is connected to a bus 24, which also is 12 bits wide. The addresses for writing into or reading from the program memory are derived from a program counter 26, which may be incremented, decremented, cleared or loaded in response to signals received from the micro program control 18.

Addresses to be loaded into the program counter may be also derived from the output of the label table 28. This is a memory which stores program segment addresses. The width of the output word of the label table, corresponds to the number of bits in the program counter, and hence to the address space available in program memory. By way of illustration, and not to serve as a limitation upon the invention, in a current implementation, 16 bits of program counter and hence bits of label table output and program memory address are available. The system is thus capable of storing 65,536 instructions in the program memory.

The inputs which are written into the label table, consisting of program addresses in the program memory, are derived from the output of program counter 26. The address in the label table, into which the program counter data is written is derived from the bus 24, and comprises a program label. The bus 24 is connected to the micro-program control which has the recognition logic required to identify a label.

In operation, the entire program is loaded, in well known fashion, into the program memory 20 from an external program source 32, which can be either tape or disk or any other source, for this information. Timing is provided by a clock source 34, which also clocks the data entry into the program memory 20. Signals to instruct the program memory to write or to read are derived from the micro program control 18, as shown in FIG. 4. After the entire program has been loaded into the program memory, the entire program is read out onto the bus 24 under control of the micro program control 18, and, if required, rewritten back into the memory. The program counter 26 is incremented to provide the address for each instruction to be read out. One instruction is read out per clock cycle. When the program controller 18 sees a label instruction which is held on the bus by the drivers 22, it increments the program counter by 1, and then instructs the label table to write at the address represented by the label the count in the program counter which is the address of the first instruction following the label.

Alternative to the foregoing, a label can be detected by the microprogram control as it is being entered into the program memory since the label will also appear on the bus 24 at that time. The program counter is incremented and the label table is instructed to store the address provided by the program counter at the address represented by the label. The stored address is obviously that of the first instruction following the label identifying that particular program segment.

In an application Ser. No. 491,647, entitled "Programmable Processor" which was filed on July 25, 1974, by this inventor, now U.S. Pat. No. 3,803,587, there is described a system in which the functions of program storage and program calls are removed from the central processing unit and are allocated to modules, which may be designated as planned logic array modules or PLA modules. The present system is not limited to but quite suitable for use with the system described in that application. The control system of the present invention issues instructions to any module in this system described in that application, one instruction per clock cycle, exactly as the master PLA module does in that application. This feature allows the control system of the present invention to issue instructions to any module in the system described in the aforesaid application including the interface modules to peripheral devices. However, it is anticipated that most high level operations, which are contained in instructions in the program memory, are actually calls from a control processor to procedures coded in one or more of the PLA modules.

With few exceptions, the balance of the instructions stored in the program memory would be instructions of a control type which are internal to the control processor itself and are never seen by the balance of the system. For example, the instructions include "DO" "UNDO" "ENDO" "IF" "ELSEIF" "ELSE" "ENDIF" and sub routine "CALL" and "RETURN". Each of these instructions is allocated a binary code which follows for example, a prefix of all ones in the four most significant locations of the instruction word. When the micro program control recognizes the four ones in the most significant four bit positions, the instruction is known to be an internal one, and the appropriate operations are executed by the control processor.

As an illustration of the type of instructions a system such as this one can use, but not to serve as a limitation, the following listing is provided:
- 00 (10 bit instruction) — normal instructions
- 01 (10 bit label) — Labl preceding an instruction list
- 1100 (8 bit argument) — put argument on data bus
- 1101 (8 bit construct) — put constant on data bus on next cycle
- 1110 (8 bit name) — to be used to call a PLA module
- 1111 (8 bit instruction code) — normal internal instruction, (i.e. "DO", "IF", etc.)

The central feature in this invention, which allows the control system to achieve high level functions and location independence in the program memory is use of the label table and program counter which handles all instructions addresses in a completely transparent manner. As will become more clear hereafter, the label table is used in a number of different ways, depending upon which particular control instruction is being executed by the control processor.

The Label Instruction

A mechanism which enables the call of a procedure defined at any point in a program from any other point in a program is the label mechanism. Each procedure is coded with a convention

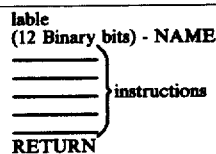

The LABL instructs the processor that the following instruction word is not an instruction but a binary label or "name" for the particular procedure being defined. The procedure then consists of the set of instructions after the label until the "return" instruction is reached, which terminates the procedure. A structured program is by definition nothing more than a large set of procedures all being called from one another and being initiated from one master procedure which is called the main program. As previously described, these procedures, in the form shown, may be loaded into the program memory in any order desired. As the program is being loaded into the program memory 20 an automatic sequence operation takes place before the micro program control actually allows itself to run a particular program.

In the automatic sequence, the micro program control system 18, in one operation mode examines the instructions being written into the program memory, or read from in a second operation mode, and when the micro program control sees a LABL instruction it increments the program counter to obtain the numeric label of the segment. The program counter count is then incremented again, and written into the label table at an address designated by the label. This was described previously. The entire program memory contents from beginning to end are thus scanned before the computer is permitted to run. The address of the first instruction in every program segment in the program memory is written into the label table under a label table address specified by the binary representation of its respective label. At any later time, a program segment can be called by merely placing the label of said segment on the control bus, instructing the label table to read out the program segment address, which is loaded into the program counter and then serves as the address of the program segment in the program memory. This sequence is performed under control of the micro program control 18.

These are the only operations executed by the micro program control during the scan phase. When the control processor reaches the end of the written program, it automatically goes into the run mode at which time it can be operated by a human operator. The scan phase can be done during initial loading, or after the memory has been loaded, and may also be repeated at any time when the control processor mode is changed from any mode in which the program memory may be written, into run. Accordingly editing or writing additional programs into the program memory can be done at will and when the operator switches the machine back into the run mode, there will be a short pause while the scan is executed. With typical system speed, a scan of 65,000 instruction program can be executed in less than two tenths of a second. This is a time which is very insignificant when compared for example to the time scale of the operator throwing the switch.

At this time, a description at the high level constructs which this invention is capable of carrying out, is provided, in the interest of providing a better understanding of the operation of this invention. A first such construct is what may be termed a Conditional Execution, here designated as the "IF" instruction.

THE IF INSTRUCTION

Any controlled must be able to change the sequence of operations it performs, dependent upon the conditions it encounters in the data system. By way of illustration, a designation "IF" followed by some condition may be used to indicate the beginning of a sequence of operations which are to be executed only if the condition is met. The term "ENDIF" is used to indicate the end of such a sequence. Upon encountering such instruction, the micro program control, in accordance with this invention, checks to see if the condition is met. If so, it proceeds to execute the instructions, ignores the "ENDIF" at the end of the group of instructions and proceeds with the first operation after "ENDIF". When the "IF" is encountered, but the condition is not present, the intervening operations are skipped and the program commences with the first step after the "END IF". A typical conditional program segment is represented below.

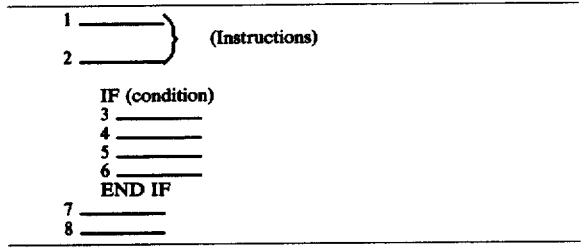

If the condition specified in the "IF" is satisfied, then execute instructions 3, 4, 5, 6, 7, 8, —. If the condition specified in the "IF" is not satisfied then execute instructions 1, 2, 7, 8,

THE ELSE INSTRUCTION

In the course of a program it is often desirable to conditionally execute some segment of the program and to execute some other programs segments if the condition is not met. This operation is accomplished through the use of the "ELSE" instruction, as represented below.

```
IF (condition 1)
    1 _____
    2 _____
    3 _____
ELSE
    4 _____
    5 _____
END IF
6 _____
```

In this example, the condition is tested when the "IF" statement is encountered. If the condition specified by the "IF" is met, the program steps 1, 2 and 3 between the "IF" and the "ELSE" are executed and the steps 4 and 5 between the "ELSE" and the "END IF" are skipped, and execution is commenced with the instruction 6, immediately after the "ENDIF". However, if the condition established by the "IF" is not met, the program statements 1, 2, and 3 between the "IF" and "ELSE" are skipped and those (4 and 5) between the "ELSE" and "END IF" executed. In this way, a two way branch can be constructed depending upon the result of the test.

THE ELSEIF INSTRUCTION

In many cases it is desirable to branch more than two ways, depending upon the results of the test. A multiple way branch can be constructed by using the "ELSEIF" construct, as shown below.

```
IF (condition 1)
    1 _____
    2 _____
    3 _____
ELSE IF (condition 2)
    4 _____
    5 _____
    6 _____
ELSE IF (condition 3)
    7 _____
    8 _____
ELSE
    9 _____
    10 _____
END IF
11 _____
```

In this example, the control system tests the condition when encountering the "IF" statement and if the condition specified by the "IF" statement is met, it executes the program statements 1, 2 and 3 between the "IF" and the first "ELSEIF" Thereupon it branches directly to the first program statement (11) after the "ENDIF" and continues. However, if the condition specified by the "IF" is not met, the program skips to the first "ELSEIF" and if the condition specified by the first "ELSEIF" is met, it executes the program statements 4, 5 and 6 between the first and second "ELSEIF" Thereafter, it branches to the first program statement, (11) after the "ENDIF". However, if the condition specified in the first "ENDIF" is not met, all program steps are skipped until a first "ELSEIF" is encountered wherein the condition specified are met. For example, condition 3 is met. Then program steps 7 and 8 are executed. When "ELSE" is encountered, the program branches to the first statement (11) after the "ENDIF". If none of the conditions specified by an "ELSEIF" are met, the control system skips all program statements until the "ELSE" is encountered. It then executes the statements that follow "ELSE" (9, 10) and then continues on past "ENDIF" to statement 11, etc.

The "IF" instruction like the "DO" instruction described below, is an internal instruction which is immediately followed by a binary label. During the scan phase the control recognizes the "IF" instruction, increments the program counter and remembers the label attached to the particular "IF" group. When the "END IF" corresponding to that particular "IF" is encountered in the program, the "IF" label is placed on the processor bus, the program counter is incremented, and a write label table operation is executed. Hence, during run time, when a particular condition is met, the segment of the program correspondingly to that condition is executed, thereafter the program can immediately branch to the instruction following the "ENDIF" since that instruction is bound in the label table under the label of the particular "IF". From there the program can continue. If a "DO" or an "IF" is nested if another "IF", when the condition is not met, the label is loaded into the label table and the entire "DO" or "IF" is skipped.

THE DO INSTRUCTION

It is often desirable to repeat a particular set of operations either for a given number of times, or until a certain condition is encountered. In terms of a program, the repetition loop consists of executing a certain sequence of instructions and then returning to the first instruction in the sequence and executing the sequence once again. Any repetition loop of this sort specifies the point where the repetition loop begins, the point where it ends and must contain some means for terminating the repetition, when a desired condition is reached. If the present context, the word "DO" is used to indicate the point from which the sequence returns to the initial point. The term "UNDO" is used to indicate termination of the sequence of operations which then commences at the program step immediately following "ENDO". A typical program written in these terms is as follows:

```
DO
    1 _____
    2 _____
    3 _____
IF (condition)
    4 _____
    5 _____
UNDO
ENDIF
    6 _____
    7 _____
ENDO
8 _____
```

Here, upon encountering the "DO" label instructions 1, 2 and 3 are executed. If the "IF" condition is not specified the machine skips from instructions 3 to instructions 6, 7 and then back to 1. When the "UNDO" condition is encountered the machine skips to the first instruction after the corresponding ENDO (instruction 8) and continues executing subsequent instructions. Hence if the "IF" condition is satisified, instruction 4 and 5 are executed. The machine then skips to instruction 8 and continues.

As indicated above, repetition is carried out by the "DO". Any repetitive operation specified by "DO", requires the ability to break out of the repetition then some condition is met. Breaking out of the repetition require that the program sequence begins at the instruction immediately following the "ENDO" instruction, corresponding to that particular "DO" loop. The way this operation is implemented is as follows:

The "DO" instruction is an internal instruction and is followed by a binary label. During the scan phase, the control processor recognizes the "DO" instruction, increments the program counter and remembers the label attached to the particular "DO" loop. When the program memory read out has arrived at the "ENDO" corresponding to that particular "DO" instruction, this is recognized and the program counter is incremented, the label corresponding to the "DO" instruction is placed on the processor bus, and a write label table is executed. In this way, the program memory address corresponding to the instruction immediately after the "ENDO" is fixed in the label table under the label specified in the "DO" instruction. Hence, if at any time during the execution of the loop an "UNDO" instruction is encountered at run time, the processor need only branch to the label corresponding to the "DO" being executed, terminate the loop and get the instruction immediately after "ENDO".

From the foregoing it should be understood that the label table stores a program memory address of the instruction following the "END IF" or "UNDO" at the location in the label table specified by the particular "IF" or "DO" with which the particular "END IF" or "UNDO" is associated. The label table does not store the address at the "IF" or "DO" instruction.

NESTING

The most powerful construct used in structured program design is that of nested program segment. The basic idea behind nesting is that a human being can contemplate and design a system function or set of operations at any level, provided that he can grasp and hold in his mind at one time an entire set of functions which can be executed at that level. Although individuals differ, typical program designers can grasp fully and in detail approximately the amount of information which can appear in an uncluttered printed page. This fact has lead many outstanding program designers to limit the number of statements in a given program segment to less than 50 or so, depending upon the individual. Clearly, a complicated program can not be fully reduced to machine executable code in fifty program statements. However, it is possible to write in a few lines the high level function which must be executed for even the most complex program, if the level of the statements are chosen sufficiently high.

FIGURE 3

Reference is now made to FIG. 3 which is a block schematic drawing of the program record keeping portion of this invention. This apparatus is organized around the bidirectional bus 24, on which the output of the program memory is placed. A "stack pointer" 38 is an up-down counter having the same number of bits as the bus 24. It may be incremented or decremented upon command from the program control system 18. Its output is applied to the bus and can then be entered into the label register 30, upon command, for addressing the label table. A "MAX LABEL LATCH" 40 or latch circuit, contains the same number of bits as the bus, can be loaded with the data present on the bus, can transfer its contents onto the bus, all on command from the micro program control circuit shown in FIG. 4.

A single direction Q latch or register circuit 42 is provided, which can receive data from the bus and applies its output as one input of a comparator 46. The Q latch may also be loaded on command from the micro program control shown on FIG. 4. The other input of the comparator, which is to be compared with the outputs of the Q latch, comes directly from the bus 24.

A label stack memory 44 is an ordinary memory which has an up-down counter 46 connected to its address label. The up-down counter and the label stack memory are under control of the micro program control shown in FIG. 4. The label stick may be loaded from the bus. The width of the label stack memory equals the number of bits on the bus plus several "condition" bits. These "condition" bits are derived from the comparator output. One additional condition bit, which will be called the DO bit, is derived from the program control. The outputs of the label stack memory, with the exception of the condition bit outputs, can be fed to the bus on command from the program control. The condition bit outputs of the label stack memory are fed directly to the micro program control.

The interface of the bus 24 to the rest of the computer equipment includes driver circuits or drivers 50 which drives an outgoing data bus 52 that connects to the program control and also to the data processor. Drivers 54, drive a command bus 56 that connects to the program control and data processor, with signals received from bus 24. A returning data bus 58 connects to drivers 60, whose output is applied to a priority encoder 62. Thus, the contents of the bus 24 can be applied to and latched on either a command bus 56, or to a data bus 52, by the drivers respectfully 54 and 50. All the driver circuits are under the command of the micro program control 18. The bus 24 is also connected to the micro program control, shown in FIG. 4.

The data bus 58 signals are applied by the drivers 60 to the priority encoder 62 which is primarily designed for use with interrupts. It takes a code from the data bus and encodes the highest bit which is present in that code, into a binary number. On command it places the binary number on the internal processor bus. The encoder, and its latch are also available for encoding any data present on the internal bus 24, if desired. This is afford by the connection shown between the internal bus 24 and the inputs of the priority encoder.

EXECUTING A CALL INSTRUCTION

During the scan phase of the operation of this system, there was allocated a true program memory address which can be read out of the label table memory by applying the label as an address to the label table. Hence, from any point in a program, a call instruction can be executed by merely placing the label of the procedure to be called on the bus 24 and executing a "load program counter" operation, (i.e. read program address out of label table and into program counter). However, before executing the sequence of operations specified under the program being called, it is necessary for the system to store the return location so that after the completion of the call procedure, the processor can continue execution at the program step immediately following that which called the procedure. A well known technique for saving a return address is a "push-down stack". A push-down stack is, for example, a memory with an up-down counter on its address leads. When it is desired to save a certain location, that location is placed as an input to the memory, the address is incremented and a write memory operation is executed.

In accordance with this invention, the label table is also used as a push-down stack, starting the storage of the return address from the opposite end of the label table memory, from that used for the labels attached to program entries. For example, if the labels were chosen starting with a label table address all ones and working down toward all zeroes, the stack would start with a label table address all zeros and work up. The stack pointer is initially loaded with an address at the opposite end of the label table label storage region. A protection mechanism is built into the hardware of this invention, which avoids writing the stack portion of the label memory over the label table portion.

The up-down counter 38, which addresses the label table to convert it into a push-down stack, is called a stack pointer. Its outputs are placed on the bus 24, each time that the label table is used as a push-down stack. The number contained in this stack pointer is also an indication of how deep a program is nested in procedure calls at run time.

When the micro program control receives a call instruction from the bus, it increments the program counter 26, increments the stack pointer 38, and writes into the label table at the address indicated by the stack pointer, the address which is in the program counter. The address which has thus been written into the label table is then the return point from the procedure which is called and it is placed on the top of the stack in the label memory. That is, it is the first return address available. The stack pointer retains the label indicative of that storage location until a RETURN occurs.

The label of the procedure being called is placed on the bus then used to address the label table which loads the address of this procedure into the program counter. The program memory address is thus set at the first step of the procedure to be executed. This procedure is then read out of the program memory and execution is commenced.

If during the execution of one procedure, another procedure call is encountered, the process is repeated. This time, the return address being saved will be at some point in the first procedure to which the processor will return when the second procedure terminates and a RETURN instruction is issued. Upon recognizing the RETURN instruction, the program control causes the stack pointer contents to be applied to the bus and thereby, through the use of the label table, the address of the return point from the most recently called procedure is loaded into the program counter. Thereafter, read out from the program memory will provide an instruction such that execution of the program can occur at the proper return point. The stack pointer is now decremented so that it now provides the address in the label table where is stored the return address in program memory for the current procedure, when required. Hence, when the next RETURN instruction is encountered, the process of getting back to the return point is repeated. Accordingly, in this manner, the processor automatically threads its way backwards from procedures nested as deep as desired. The only limitation to the level of nesting is the number of storage locations available in the label table, less those required for actual procedure entry labels and DO and IF labels found during the scan phase. It should also be clear, that this organization allows recursive calls of procedure by itself or calls of one procedure by a procedure which calls it.

The only possible problem with using the label table in these two different ways is that a program may be executed where the data requires recursive calls deeper than the available space in the label table would permit. In order to guard against the label portion of the table being written over by the push-down stack portion, the following precautions are included.

During the scan operation, where label addresses are being recorded in the label memory, whenever a binary number representative of a label is placed upon the bus, it is also written into the Q latch 42 under a load instruction from the program control. Immediately afterwards, the contents of the Max Label Latch 40 are compared with the contents of the Q latch by the comparator 46. The Max Label Latch contents start out at zero. If the output of the Q latch is greater than that of the Max Label Latch, the new larger label number is written into the Max Label Latch. This operation continues under the control of the program control system until the end of the scan phase with the result that the Max Label Latch will contain the largest label used in the program (or if the labels are used starting at all ones, the smallest label used in the program).

At run time, whenever the stack pointer is incremented and its output is placed on the bus, this output is also latched in the Q latch. The Max Label Latch contents are placed on the bus immediately thereafter and the comparison is made. If ever the two are equal, the comparator produces an output signal calling for a panic stop. This is sensed by the program control system, and the machine is locked up to the state at which it encounters the problem. In this way, the user may examine at what point in the program the error occurred.

With the small amount of hardware organized as shown, the control processor is capable of handling arbitrarily nested levels of procedure calls including recursiveness. It is also capable of dynamic allocation of label table between procedure entry labels and return point labels at run time and as shown, has an automatic detection feature which prevents the push down stack at run time from running up into the space reserved for entry labels.

THE "DO" GROUP

During the scan phase, when the program control system sees a DO instruction, it increments the program counter thereby placing the binary label corresponding to the DO instruction on the processor bus, from where it is written into the label stack memory at an address determined by the up-down counter 48.

When, in the course of the scan of the program memory, an ENDO instruction is encountered, this is recognized by the program control system which then causes the program counter to be incremented and the DO label, which is on top of the label stack memory is caused to be read out of the label stack memory onto the processor bus, from the processor bus it is loaded into the label register which uses it as an address for entering into the label table the address of the program step after the ENDO now present in the program counter. Following this, the address in the label stack memory up-down counter is decremented or "popped". The label table now contains the address needed to terminate a DO loop which can be called out by the UNDO instruction.

If, two DO loops are nested, one inside the other, the first and second DO labels are "pushed down", i.e. the second DO label is stored at an address where it is called out of the label stack memory before the first D0 label. By the nature of the nesting rules, for such loops, the ENDO for the inner DO loop will occur before the ENDO of the outer DO loop. The DO labels in the label stack memory are read out in that order to serve as the addresses for the respective ENDOs in the label table memory. Accordingly, during program memory scan time the terminating addresses of these loops are properly fixed by their associated DO labels. In this way, arbitrary nesting of DO is permitted within the range of the label stack memory. In an embodiment of the invention which was built, by way of example, 16 levels of nesting were provided.

During run time, a similar use is made of the label stack memory. When a DO instruction is read out of the program memory, the program counter is incremented and the label corresponding to the DO instruction is located onto the label stack memory. The program counter is then incremented again, and the stack pointer counter 38 is incremented. The stack pointer output is connected to the bus 24, and loaded into the label register. A write lable table operation is executed, whereby the address of the first instruction in the program memory after the DO label is entered into the label table, now operating as a stack, at the address provided by the stack pointer. As the instructions in the DO loop are executed, unless an UNDO is encountered, the program will eventually encounter an ENDO instruction. This instruction causes an output from the stack pointer to be placed on the bus, and again it acts as an address for reading out of the label table. The program control system calls for the label table to perform a read out operation from that address and the address which is read out is loaded into the program counter. Following this a program memory read operation is performed whereby the first instruction after the label of the DO loop is read out of the memory starting the loop all over again. Hence, until an UNDO instruction is encountered, the processor will continue to execute the instructions given in the DO loop.

When an UNDO instruction is encountered, this is recognized by the micro program control system which instructs the label stack memory to read out onto the bus the label at the top of this memory. If a DO identifying bit is present at this time in the condition bit output of the label stack, this is recongnized as DO by the program control system which then enables this label to be used as an address for a read out from the label table. This as previously described, is the label of the address of the instruction following ENDO. This address is loaded into the program counter. In this way, in response to an UNDO instruction, the program branches immediately to the first instruction following the ENDO corresponging to that particular DO loop. The reason for the conditional test for the DO bit is that the same label stack is used as an exit mechanism for the IF group and a very common case which occurs when an IF is nested inside of a DO loop is that the branch label at the top of the label stack corresponds to exiting the IF rather than exiting the DO. In such a case the label stack is continued to be "popped" until the DO bit is encountered. The label corresponding to the first encountered DO bit is then placed on the bus and a load program counter operation is executed thereby performing a proper exit from the DO loop.

THE IF GROUP

During the scan phase, when the program control system sees an IF instruction, it increments the program counter thereby placing the binary label corresponding to that IF instruction on the bus, That label is then written unto to the label stack memory, which stores the IF label. When an ENDIF instruction is encountered, the program counter is incremented, the IF lable on top of the label stack is placed on the bus, thereby acting as an address into the label table, and a write label table is executed whereby the address of the instruction following the ENDIF in the program memory is written into the label table at the address represented by the particular IF label which is on the bus. During the run mode, when the program control sees an IF statement, it clears the Q latch to zero and applies a signal to the drivers 60 from the data bus 58 whereby the data bus signals are placed on the bus 24. The comparator 46 compares the data bus signals with the Q latch output. The comparator output then indicates the relative value of the data bus data compared with (for example) zero. This condition is then written into the label stack memory in the condition bit section, along with the label corresponding to the IF statement. This condition is used by the micro program control to determine whether or not the condition for a particular IF or ELSEIF statement has been successfully met. Conditions available for a machine that was built were, by way of example, "less than", "less than or equal to", "equal", "not equal", "equal to or greater than", and "greater than". Hence there are six separate IF instructions and six separate ELSEIF instructions.

The condition is tested. This is done by the micro program control system which compares the condition bits with, the bits required by the particular IF instruction. If it is successfully met, the processor begins to execute the instructions being read out of the program memory, following the IF label, until an ELSEIF or an ELSE command is encountered. In response to such an encounter during the execute mode of the computer, the IF label, which is at the top of the label stack memory is placed on the bus. With this as an address, the label table then loads the program counter with the address following the corresponding ENDIF. The machine can then commence executing the instructions which are read out of the program memory which immediately follow ENDIF.

If the condition given in the initial IF statement is not met, the micro program control system causes the processor to go into its skip mode whereby, each instruction read out of the program memory is interrogated, in turn, but not executed. If while the processor is in the skip mode it encounters an ELSEIF instruction, it once again tests the condition at the top of a label stack memory against that given for the ELSEIF. The comparison test is done by the micro program control. If the two conditions coincide, the processor reverts to an execute mode and proceeds to execute the instructions under the ELSE statement as if it were executing an IF statement. However, if the program control system finds that the condition specified with the ELSEIF statement do not correspond with those at the top of the label stack the processor controller continues in the skip mode as before. If the processor controller, while in the skip mode, after an IF or ELSEIF encounters an ELSE statement, it immediately reverts to the execute mode and continues. In this case the ENDIF statement is treated as not operative.

The system just described, successfully allows any combination of ELSEIFS followed by an ELSE after an IF statement and automatically handles the exit properly. Once an exit is performed, the label is popped and thus nesting of IF's and DO's together or IF's inside of other IF's in any order is fully permitted. The only difference initially in the loading of the label stack is that a DO instruction places a DO bit on the condition portion of the stack whereas the IF condition places the result of the comparator test upon the condition portion of the label of the stack.

INTERRUPTS

Should an interrupt code, generated by some external device, be applied to the command bus of the computer, the micro program control in accordance with this invention, generates an interrupt vector routine. This routine results in the placing of an interrupt acknowledge code on the command bus 56 and any interrupting devices are expected to respond by grounding one wire of the data bus (previously allocated) during the next clock cycle. The interrupting device with the highest priority is assigned the highest order bit of the data bus. Thus, in this implementation for a single level interrupt, up to 8 interrupt devices are provided for. The inputs from the data bus 58 are applied to the priority encoder 62 which, in response generates a priority routine, (the lowest labels are reserved for interrupts), for the particular interrupt code. This code specifies the highest order data bus bit which has been activated as a result of an interrupt acknowledge command. This code is then placed on the bus 24 and is used as an address for a read out from the label table to obtain the address of the particular interrupt program routine which is to be followed in response to that particular code. This address, which was loaded into the label table during scan time, is then loaded into the program counter and the program memory is then read to provide the particular interrupt routine required. Thus, the highest priority interrupting device causes a call to a procedure with the binary label corresponding to its priority.

FIG. 4

Referring now to FIG. 4, there may be seen a block schematic diagram of a micro program control system in accordance with this invention. The control system is basically a reasonably conventional design and thus, need not be described in detail. It comprises a circuit arrangement which can implement random logic using programmable techniques. It is known as a programmable logic array structure and basically comprises an array of AND gates designated in FIG. 4 as the AND plane 70, which are adjacent to an array of OR gates, designated in the drawing as the OR plane 72. The AND gates in the AND plane feed their outputs to the OR gates in the OR plane. There is a feed back arrangement between the arrays which are through flip-flops 74, to which some of the OR plane outputs are applied, and the flip-flops apply their outputs to some of the inputs to the gates in the AND plane. The flip-flops, (or dynamic storage elements), are used in the feed back loop between the OR plane and the AND plane to permit implementation of the sequential logic. Sequential logic is what is performed by these arrays. Complete information on the circuit structure of these arrays is found in the literature, and also is provided in the form of a textbook published for a course given by Texas Instruments Inc., of Dallas, Tex., entitled "The MOS Course Supplement". The title of the specific article in said text is "MOS/LSI Programmable Logic Arrays" and it was published in 1971 by Texas Instruments Inc. Effectively, there is indicated that the PLA is actually a big read only memory (ROM), with a programmable, nonexhaustive decode section, that has been adapted to the implementation of random logic. The programmable logic array, (PLA) can be custom programmed, for example, by the use of a photographic mask, to provide a desired arrangement for the logic gates. Effectively, the AND plane comprises a product term generator matrix which feeds its product term outputs to a sum of products generator, which is the OR plane. Several companies in the semiconductor memory field, besides Texas Instruments Inc., manufacture and sell PLA's.

Amongst other inputs into the AND plane, are the condition bits from the label stack memory. Also provided are two signals from the clock source 34, which specify which time period, within a machine cycle, a particular micro-instruction is to be executed. A panic stop signal is applied from all of the detectors in the computer which are used for detecting when a panic stop should occur. For example, the output of the comparator is a panic stop input when it detects that the address in the Q latch is larger than the address in the Max Label Latch, when the machine is in the run mode, whereby writing over the program addresses written in the label table is prevented. An interrupt signal is also used as an input. This can come from any one of the source of interrupt signals within the machine. The command bus connects to an encoder 76. The encoder encodes the command bus signals into a more compact form and then applies them to the PLA AND plane.

The internal bus 24 connects to an encoder 78 which encodes the bus 24 signals into a more compact form. These are then applied to a multiplexer 80. The multiplexer will either transfer the instruction signals received from the encoder 78 to a latch circuit 82, or under signal instruction from the OR plane will transfer to the latch 82 a substitute instruction which has been generated by the OR plane. The latch circuit applies the instruction to the AND plane until it receives a new instruction. Load and transmit instructions to the latch circuit 82 are also applied by the OR plane. The latch circuit supplies its output to the AND plane for as long as is required for execution of an instruction. The instructions supplied by the OR plane to the multiplexer are substituted, for example, when an interrupt routine is called for, or an instruction requires more than one machine cycle.

All of the control outputs required for FIGS. 2 and 3, such as the read and write instructions to the program memory, label table and label stack, also the increment, decrement, clear and load instructions to the program counter, to the stack pointer, and to the up-down counter 48, the instructions to the Q latch and MAX label latch, as well as to the priority encoder, are represented as the control outputs $84_1$, $84_2$, $84_n$ which are shown emanating from the OR plane 72.

It is well within the ability of those skilled in the art to translate the operations described hereinabove into microprogram code for the programmable logic array. However, to illustrate how a PLA may be implemented, a schematic diagram, FIG. 5, illustrating a portion of a PLA, is provided. The line bisecting the drawing, separates the AND plane 70 from the OR plane 72. Four instructions are shown by way of examples, DO (Run TIME), DO (Run TIME Skip Mode), Label (Scan TIME), and Interrupt. These are indicated on the left side of the AND plane. At the top of the AND plane there are indicated the names of the signals being received. At the top of the OR plane are indicated the names of the input signals.

Four clock times are provided, T0, T1, T2, T3, for each instruction. The "1"s and "0"s shown in the AND plane exemplify the signals decoded by the AND plane and the "1"s in the OR plane signify the command signals which are sent out.

Now starting with the label DO (Run Time), at the upper left of the AND plane and looking at the top line of the AND plane, there is a 0 in the interrupt line, and there is no "Load Time" signal. A "1" exists in the "Run Time" line, a "0" in the skip mode line. The two time slot signals, "0, 0" indicate T0 time. The binary representation of the "DO" instruction (shown as DO), is under the Instruction label.

In response to all of the above indicated input signals, the OR plane will send a command to increment the program counter (P. C. Inc.), the label stack register will be incremented to provide the next available address for storage (Labelstk Push), and the Stack pointer is instructed to increment, (Stkpointer Inc).

At T1 time the Program Memory is instructed to read out the instruction whose address is provided by the program counter, (Prog Mem Out). Also a DO "condition bit" (DO bit) output is provided by the OR plane. This is stored in the label stack memory.

At T2 time the stack pointer contents are put on the bus (Stkpointer Out) and the Q latch stores the contents of the stack pointer for comparison with the Max Label Latch contents, (QLch). The program counter is incremented again, (P. C. Inc.). If no panic stop has occurred because Q latch contents are greater than Max Latch, then the label stack is instructed to write the address in the program counter at the address location indicated by the stack pointer (Label Stk Write).

At T3 time the program memory is commanded to read out a new instruction from the location specified by the address in the program counter, (Prog Mem. Out), and the new instruction latch shown in FIG. 4 is instructed to latch this instruction (New Instr) coming from the program memory rather than one provided from the OR plane. It will be noted that there is provision in the OR plane for "New Instr. substitute". These are the instructions which in response to, for example, an interrupt request, are substituted by the multiplexer in FIG. 4 for the instruction on the internal bus 24.

For normal instructions, the program memory passes the 10 bit on the command bus.

It is believed that from the foregoing description it should be clear to those skilled in the art how the PLA produces commands which operate the remainder of the circuits shown in FIGS. 2 and 3 to produce the operations previously described herein.

It is also clear that any other embodiment of a sequential state machine can be used to activate the microprogram sequencing.

Figure 6:
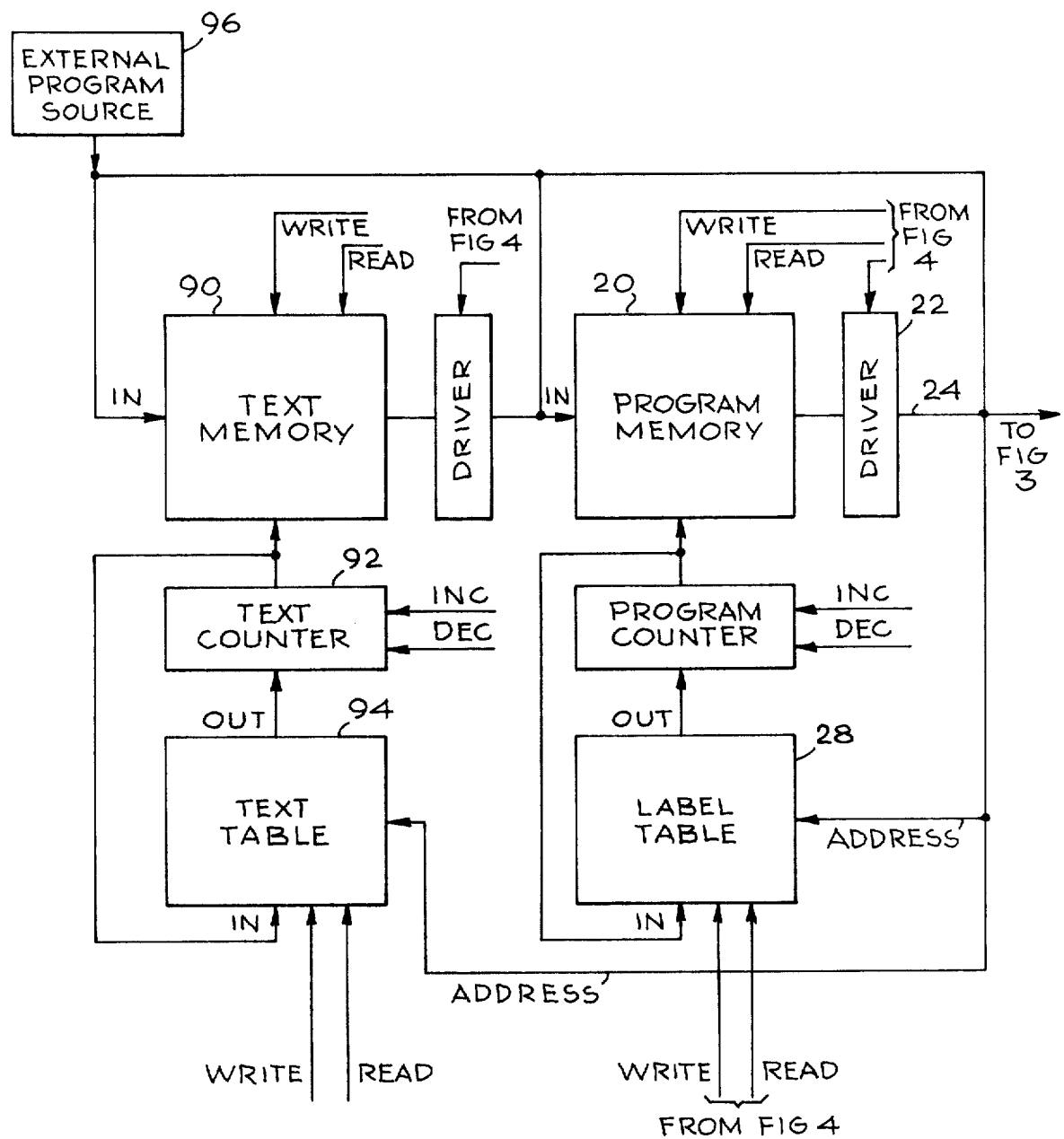
FIG. 6 schematically illustrates an option which may be used with this invention.

FIG. 6 is a schematic diagram illustrating an optional arrangement which may be used as part of this invention which enables the reconstruction of an original program in English text and which makes a diagnostic routine in case of error a simple matter and adds to the "transparancy" of the machine.

Current well written programs are a highly nested set of program segments forming an execution tree. The topmost segments of this execution tree are normally English text whereas the bottommost segments terminating each branch of the tree are executable code. A very simple compiler is used to translate a program, organized as indicated into a form suitable for loading into the memory modules of the system. Each segment in the program is identified by an English (or other human language) text string and has a binary label at the point in the program where the program segment is defined. At any other point in the program where the segment is called by name, the human language text string is replaced by the binary label.

In FIG. 6, there is represented a text memory 90 which is addressed by a text counter. Address information is provided by a text table memory 94, in manner similar to the way in which the program counter receives address information from the label table. As a matter of fact the interoperative relationship between text table, text counter and text memory is the same as that of the program memory, program counter and label table. Both are operated under control of the micro programmer. An external program source 96 which includes a program compiler supplies program representative signals to the bus 24 from whence these are loaded into the respective text memory and program memory in a manner to be described.

The program is supplied to the bus 24 character by character. Under micro programmer control both text memory and program memory are respectively loaded with program segments in the respective human language text and machine instruction language form with the locations of the program segments in the respective memories as indicated by the respective text counter and program counter, being stored in both the respective text table and label at locations specified by the label of the segment.

Accordingly, at the end of the scan interval, because of the original organization of the program segments, the program which is stored in the program memory consists of a set of program segments each beginning with a label statement and a binary label and ending with a return instruction and consisting of executionable code. In the text memory there is stored the human language identifiers of all program segments bound under the same binary labels as their analagous program segments in the program memory. In the text table memory there is stored the addresses of the human language identifiers stored in the text memory.

In view of the foregoing, whenever it is desired to list or generate a diagnostic routine because of some error condition encountered in execution, the procedure by which the program was entered is merely reversed. For example, in order to list the program, the program counter is cleared and a scan is begun through program memory. Whenever a call statement is encountered the label which is being called is applied to the text table memory which provides the address in text memory of the text bound under this label. This text is then read out of the text memory onto the bus 24, then to the data bus from where it is either printed out or displayed by a CRT.

In this way a complete reconstruction of the original program can be made from the actual object program residing in the machine. This reversibility allows the machine to be quantitatively more transparent than a typical interpretive system and yet execute high level structured programs with a performance equal to the best compiled code. The generation of diagnostics, program traces, etc., can all be done in the English language identifiers originally written by the programmer.

There has accordingly been described and shown herein a novel and useful method and means for implementing the control structure of a computer.

Although particular embodiments of the invention have been described and illustrated herein, it is recognized that modifications and variations may readily occur to those skilled in the art and consequently it is intended that the claims be interpreted to cover such modifications and equivalents.

The embodiments of the invention in which an exclusive property or priviledge is claimed are defined as follows:

1. In a programmed digital computer, apparatus for loading a program into a memory in a manner to be location independent so that each segment of the program may be selectively accessed for modification or debugging without affecting the balance of the program, wherein each given program segment is identified by a program segment label comprised of a group of coded digital signals which precedes a plurality of instructions that follow said label and that comprise a program segment, comprising
    a program memory,
    a source of a plurality of program segments each including a program segment label followed by a plurality of instructions,
    means for sequentially transferring said plurality of program segments into and out of said program memory,
    a program counter means for counting storage addresses used in providing to said program memory the addresses for storage and for read out of program labels and instructions from said program memory,
    a label memory means, wherein each label memory address is represented by a program segment label,
    label detecting means for detecting when a program segment label has been transferred by said means for transferring said plurality of program segments,
    control means, responsive to a label being detected by said label detecting means, for loading in said program counter the address at which the first instruction after said detected program label is stored in said program memory, and for addressing said label memory means with the detected program segment label, and means responsive to said label detecting means and said control means for storing said loaded address in said label memory means at an address represented by said detected program segment label, whereby a program segment can be selectively read out for modification or debugging by addressing said label memory means with a programmed segment label to obtain the address in said program memory of the first instruction of the program segment.

2. Apparatus as recited in claim 1 wherein said label detecting means detects said label as it is being transferred into said program memory.

3. Apparatus as recited in claim 1 wherein there is included sequence means for actuating both said program memory and said program counter means for successively reading out the contents of said program memory from addresses successively provided by said program counter means, and
    said label detecting means detects said label as it is being read out of said program memory means, 4. Apparatus as recited in claim 1 wherein an identifying label is associated with one of said instructions, designated as DO, which specifies that several of the immediately following instructions should be executed until the occurrence of an instruction designated as ENDO, when a return should be made to the instruction immediately following the DO instruction for reexecution of said immediately following instructions, and this procedure should be followed until an UNDO instruction is received, at which time the DO instruction procedure is terminated and the next instruction to be executed is the one immediately following the ENDO instruction, said apparatus comprising
    first means for detecting a DO instruction and its associated label when it is read out of said program memory during operation of said sequencing means,
    a label stack memory means,
    means responsive to a DO detection by said first detecting means for actuating said label stack memory means to store said DO label,
    first means for detecting an ENDO instruction during operation of said sequencing means,
    means responsive to a detection of ENDO for incrementing the address in the program counter means to represent the address in the program memory of the first instruction following the ENDO instruction,
    means responsive to said detection of ENDO for actuating said label stack memory means to read out and apply said DO label as an address to said label memory means, and
    means responsive to said detection of ENDO, to activate said label memory means to store, at a location represented by said DO label, the address set forth in said program counter means.

5. Apparatus as recited in claim 4 including means operative when said program memory is not being loaded or scanned and said computer is in an instruction execution mode, said means comprising
    second means for detecting a DO instruction and its associated label read out of said program memory when said computer is in an instruction execution mode,
    means responsive to said DO detection by said second means for incrementing the program counter means to provide the address of the first instruction after said DO instruction,
    stack pointer counter means,
    means, responsive to said DO detection by said second means, for incrementing the count on said stack pointer counter means to represent an address in said label memory means,
    means responsive to said DO detection by said second means, to actuate said label memory means to write the address in said program counter means at a location in said label memory means specified by the address in said stack pointer counter means, means responsive to said DO detection by said second means for actuating said label stack memory to store said DO label, second means for detecting when an ENDO instruction is read out of said program memory, means responsive to said ENDO detection by said second means, for actuating said stack pointer counter means to apply its address to said label memory means and to enable said label memory means to transfer into said program counter means the address stored at the location specified by the address received from said stack pointer means, means for detecting when an UNDO instruction is read out of said program memory, means responsive to detection of UNDO for reading said DO label out of said label stack memory and applying it as an address to said label memory means, and means responsive to said UNDO detection for actuating said label memory means to transfer into said program counter means the address of the instruction following ENDO which is stored in said label memory means at an address represented by the label of said DO instruction.

6. Apparatus, as recited in claim 1, wherein one of said instructions, designated as IF, has a label associated therewith and has a condition associated therewith, and is followed by a sequence of instructions which are to be executed only if the associated condition is met, and immediately following the sequence is an instruction designated as ENDIF, and if the associated condition is not met then the computer is to skip all instructions between IF and ENDIF and commence operations with the first instruction after ENDIF, said apparatus comprising first means for detecting an IF instruction and its associated label when it is read out of said program memory during operation of said sequencing means, a label stack memory means, means responsive to said IF label being detected by said first means for detecting an IF label for actuating said label stack memory means to store said IF label, second means for detecting an ENDIF instruction when it is read out of said program memory, means responsive to detection of said ENDIF instruction by said second means for detecting an ENDIF instruction for incrementing said program counter means to represent the address in the program memory of the first instruction following the ENDIF instruction for actuating said label stack memory means to read out and apply said IF label as an address to said label memory means, and, means responsive to detection of said ENDIF instruction by said second means for detecting and ENDIF to activate said label memory means to store at a location represented by said IF label, the address set forth in said program counter means.

7. Apparatus as recited in claim 6 including means operative when said program memory is not being scanned or loaded by said means for sequencing and said computer is in an instruction execution mode, said means comprising means for activating said program memory to read instructions stored therein from addresses provided by said program counter, means activated when an IF instruction and its associated label is read out of said program memory, for detecting the condition associated with said IF instruction, means for comparing the condition of data in said computer with the detected condition and producing a first output when they are identical and a second output when they are not identical, means for activating said label stack to store said IF label and said first and second output, means responsive to said first output to enable said computer to execute the instructions read out of said program memory between IF and ENDIF, and means responsive to said second output to prevent said computer from executing any instructions stored in said program memory following said IF instruction until the instruction following the ENDIF label is read from said program memory.

8. Apparatus as recited in claim 1, wherein said computer is in an execute instruction mode and there is stored in said program memory an IF instruction and its associated label, and an associated condition followed by a first sequence of instructions, followed by an ELSEIF instruction followed by a second sequence of instructions, followed by an ELSE instruction, followed by a third sequence of instructions followed by an ENDIF instruction, wherein said ELSEIF has associated an alternative condition to the one associated with the IF label and said ELSE instruction immediately procedes the location of the first of the instructions which the computer should execute in the event that the conditions associated with IF and ELSEIF are not met, said apparatus comprising means for activating said program memory to read instructions stored therein from addresses provided by said program counter, means activated when an IF instruction and its associated label is read out of said program memory for detecting the condition associated with said IF instruction, a label stack memory means, means for activating said label memory means to store said IF label and the condition of data in said computer at the time said IF instruction is read out of said program memory, means for comparing said condition of data stored in said label stack memory means with the condition associated with said IF instruction and producing a first output when they are identical and a second output when they are not identical, means responsive to said first output to enable said computer to execute the instructions read out of said program memory between said IF instruction and said ELSEIF instruction, means, responsive to said ELSEIF being read out of said program memory, when said computer has executed said first sequence of instructions to read said IF label out of said label stack memory means and to apply it as an address to said label memory means, means responsive to the application of the IF label as an address to said label memory means, to read into said program counter means the address stored therein whereby the next instruction read from said program memory means is the one following ENDIF, means responsive to said second output to prevent said computer from executing any instructions until the ELSEIF Instruction and associated condition is read from said program memory, means activated when an ELSEIF instruction and associated condition is read from said program memory to compare the condition of data stored in said label stack memory means with the condition associated with said ELSEIF and producing a third output when they are identical and a fourth output when they are not identical, means responsive to said third output to enable said computer to execute instructions read out from said program memory between ELSEIF and ELSE, means responsive to the read out of ELSE from said program memory when said computer has executed the instructions immediately proceeding it for reading said IF label out of said label stack memory means and applying it as an address to said label memory means, means responsive to said label memory means being addressed by said IF label to enable said label memory means to read into said program counter means the address stored therein whereby the next instruction read out of said program memory means is the one following ENDIF, means responsive to said fourth output to prevent said computer from executing any instructions read from said program counter until an ELSE instruction is read from said program counter, and means responsive to said ELSE instruction, when said computer has not executed the instructions immediately proceeding it, to enable said computer to execute instructions read from said program memory means between said ELSE and said ENDIF.

9. Apparatus as recited in claim 1 wherein there are recorded in said program memory a number of different interrupt routing programs each having a label including a different priority code, the address of each interrupt routine program being recorded in said label table memory means under said label, said computer including means to generate interrupt signal representing a request for an interrupt routine program and including a signal representative of the priority of said requested interrupt routine program, the improvement comprising priority encoding means for generating a priority code, in response to receiving interrupt request signals, means for applying interrupt request signals from said computer to said priority encoding means, means for applying a priority code generated by said priority encoder as an address to said label table means, means responsive to the addressing of said label table means by said priority code to enable said label table to enter into said program counter the address of the interrupt routine program stored at the addressed location in said label table means whereby said program memory will next read out the interrupt routine program located at the address specified by the program counter means.

10. Apparatus for implementing the program structure of a computer as recited in claim 1 wherein there is included a source of data representative of human language identifiers of the plurality of program segments, text memory means for storing therein data representative of human language identifiers of the plurality of program segments stored in said program memory, text counter means for generating addresses for storing and for read out of said data from said text memory means, means for transferring said data to said text memory while loading said plurality of program segments into said program memory from said source of data.

means for detecting a label, and text table means responsive to the detection of a label, for storing, at locations identified by the label for each program segment, the address generated by said text counter means, in said text table means, of the first character of said human language identifier of the program segment, identified by said label.

* * * * *

UNITED STATES PATENT AND TRADEMARK OFFICE
CERTIFICATE OF CORRECTION

PATENT NO. : 4,099,230
DATED : July 4, 1978
INVENTOR(S) : Carver A. Mead

It is certified that error appears in the above-identified patent and that said Letters Patent are hereby corrected as shown below:

In column 6, line 39, delete "controlled", add --controller--

In column 7, line 68, delete "ENDIF", add --ELSEIF--

In column 8, line 23, delete "correspondingly", add --corresponding--

In column 8, line 43, delete If  add -- In --.

In column 10, line 18, delete "46", add --48--

In column 11, line 64, delete "where is", add --where there is--

Signed and Sealed this

Twenty-seventh Day of February 1979

[SEAL]

Attest:

RUTH C. MASON
Attesting Officer

DONALD W. BANNER
Commissioner of Patents and Trademarks